United States Patent [19]

Baker et al.

[11] 4,194,718
[45] Mar. 25, 1980

[54] CHOKE

[75] Inventors: Gerald S. Baker; Guerry L. Hahn, both of Houston, Tex.

[73] Assignee: Cameron Iron Works, Inc., Houston, Tex.

[21] Appl. No.: 915,539

[22] Filed: Jun. 14, 1978

[51] Int. Cl.² .................... F16K 31/122; F16K 31/44
[52] U.S. Cl. ........................................ 251/14; 74/625; 74/527; 74/424.8 VA
[58] Field of Search ................. 251/14; 74/424.8 VA, 74/527, 625

[56] References Cited

U.S. PATENT DOCUMENTS

| | | | |
|---|---|---|---|
| 2,644,485 | 7/1953 | Schwendner | 251/14 |
| 2,908,477 | 10/1959 | Buri | 251/14 |
| 3,103,133 | 9/1963 | Paul, Jr. | 251/14 X |
| 3,378,224 | 4/1968 | Boyle | 251/14 |
| 3,417,960 | 12/1968 | Stehlin | 251/14 |

FOREIGN PATENT DOCUMENTS 1021670 12/1957 Fed. Rep. of Germany ............ 251/14

Primary Examiner—Arnold Rosenthal
Attorney, Agent, or Firm—Vinson & Elkins

[57] ABSTRACT

A choke suitable for use in the wellhead of a production well including a body having an inlet, an outlet and a seat, a valve member or gate adapted to move relative to said seat to restrict flow therethrough, a pressure responsive operator connected to move the gate with respect to the seat, a manual operator connected to said pressure responsive operator, means releasably connecting said manual operator to said gate to manually move said gate and for releasing said manual operator from said gate to allow said pressure responsive operator to move said gate and a control on the exterior of said manual operator connected to said releasable connecting means.

2 Claims, 5 Drawing Figures

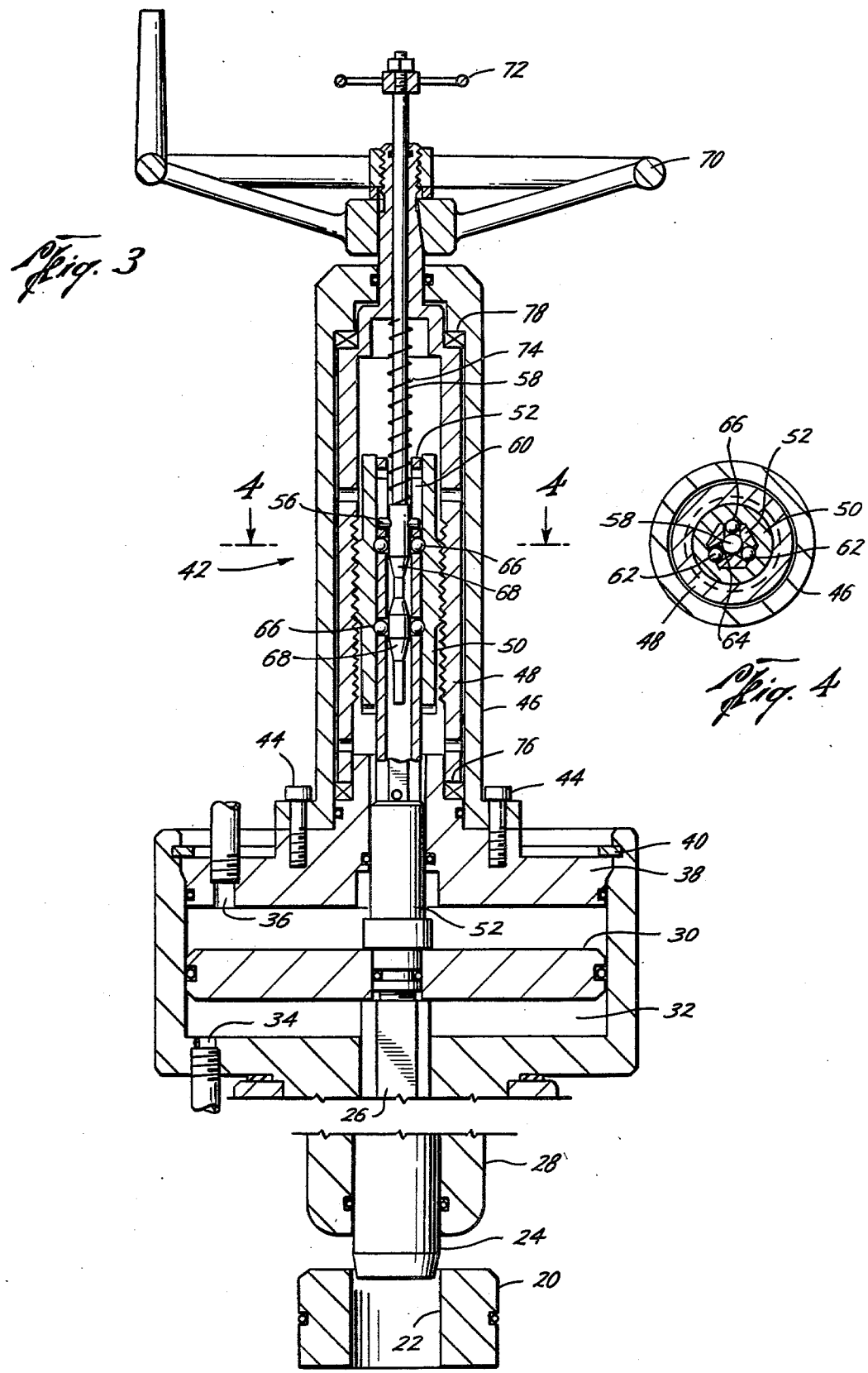

CHOKE

BACKGROUND OF THE INVENTION

Chokes at a wellhead of an oil and gas well are intended to control the flow from the well. On occasions a breakdown in the operator such as a break in the supply of operating fluid to a pressure responsive operator of the choke may occur. A manual operation of the choke which overrides the operator is desirable.

The prior patent to W. G. Bagle (No. 3,378,224) discloses a gate valve having a valve member which moves responsive to pressure differentials on a piston and also has a manual operator in which a shaft extending through the piston rod is moved by rotation of a hand wheel which rotates a sleeve threaded on the shaft. The movement of the piston moves the valve member and the manual operator.

The T. A. Stehlin U.S. Pat. No. 3,417,960 discloses a piston operated valve with a manual operator normally not threaded into the piston rod. The valve may be opened manually by threading the manual operating rod into the piston rod and continuing rotation opens the valve.

The F. E. Watkins U.S. Pat. No. 3,402,912 discloses a piston operated valve with a manually rotatable shaft threaded through the piston and connected to the valve member for manual movement of the valve member with respect to the piston.

Other patents such as U.S. Pat. Nos. 2,726,790, 2,917,073 and 3,770,029 disclose the use of balls normally retained in parts of a sleeve being cammed into a position between the sleeve part and a recess in an adjoining part to connect the two parts.

SUMMARY

The present invention relates to an improved wellhead choke which is normally operated by fluid pressure and which includes a manual operator that can move the choke to a desired position.

The choke of the present invention includes a body with a passage therethrough and a valve seat around such passage, a valve member, an actuator for moving the valve member toward and away from the valve seat to control flow therethrough, a manual operator, and means for releasably connecting the manual operator to the valve member for manual movement of the valve member toward and away from the valve seat.

BRIEF DESCRIPTION OF THE DRAWING

The improved choke of the present invention is hereinafter disclosed with reference to the drawings wherein:

FIG. 1, which includes FIG. 1A shows the choke body and FIG. 1B shows the pressure responsive operator and the manual operator in engaged position.

FIG. 3 is a sectional view similar to FIG. 1B showing additional details.

FIG. 4 is a transverse sectional view taken along line 4—4 in FIG. 3.

DESCRIPTION OF THE PREFERRED EMBODIMENT

Figure 1A:
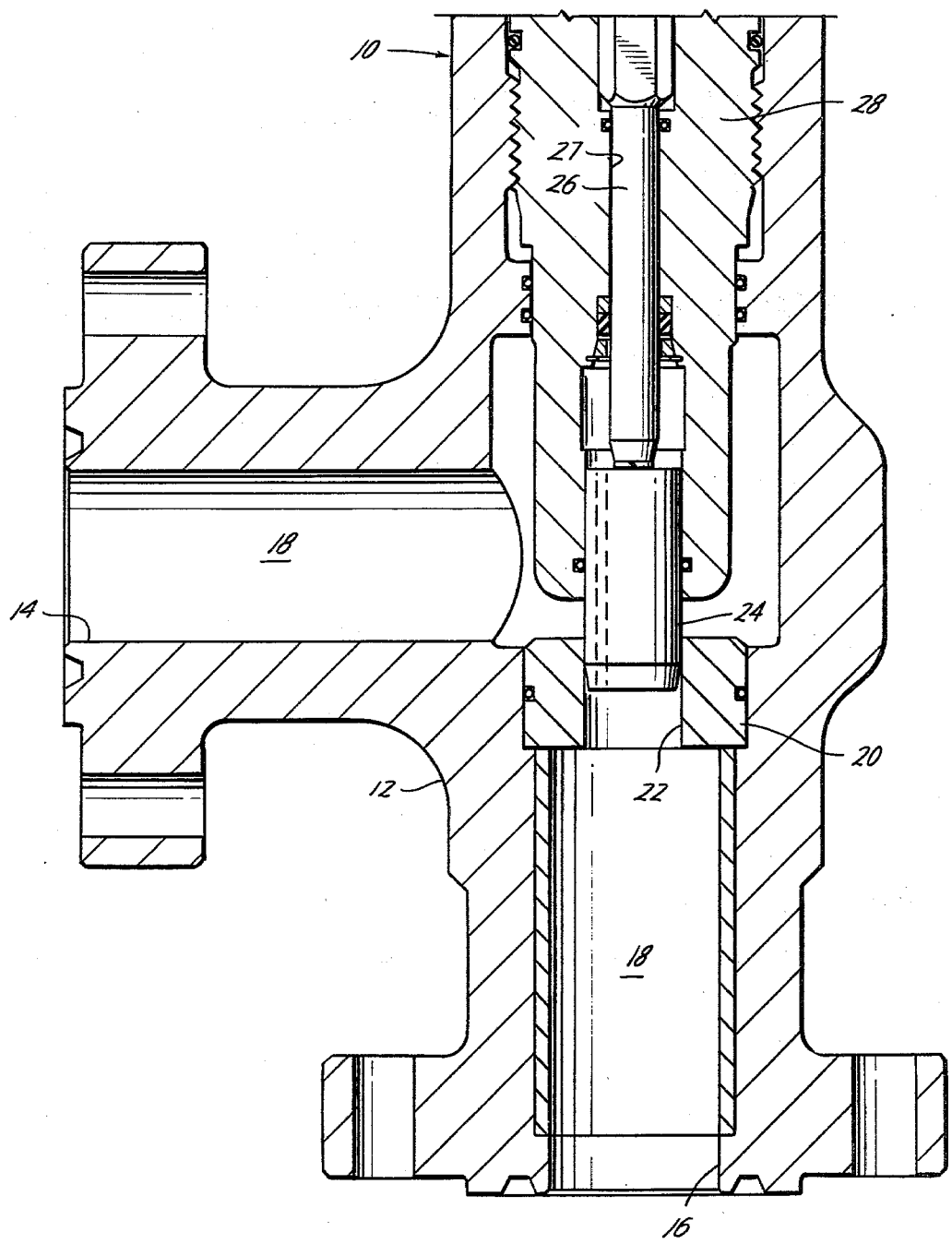
FIGS 1A and 1B, is a sectional view of the preferred form of the improved choke of the present invention.
Figure 1B:
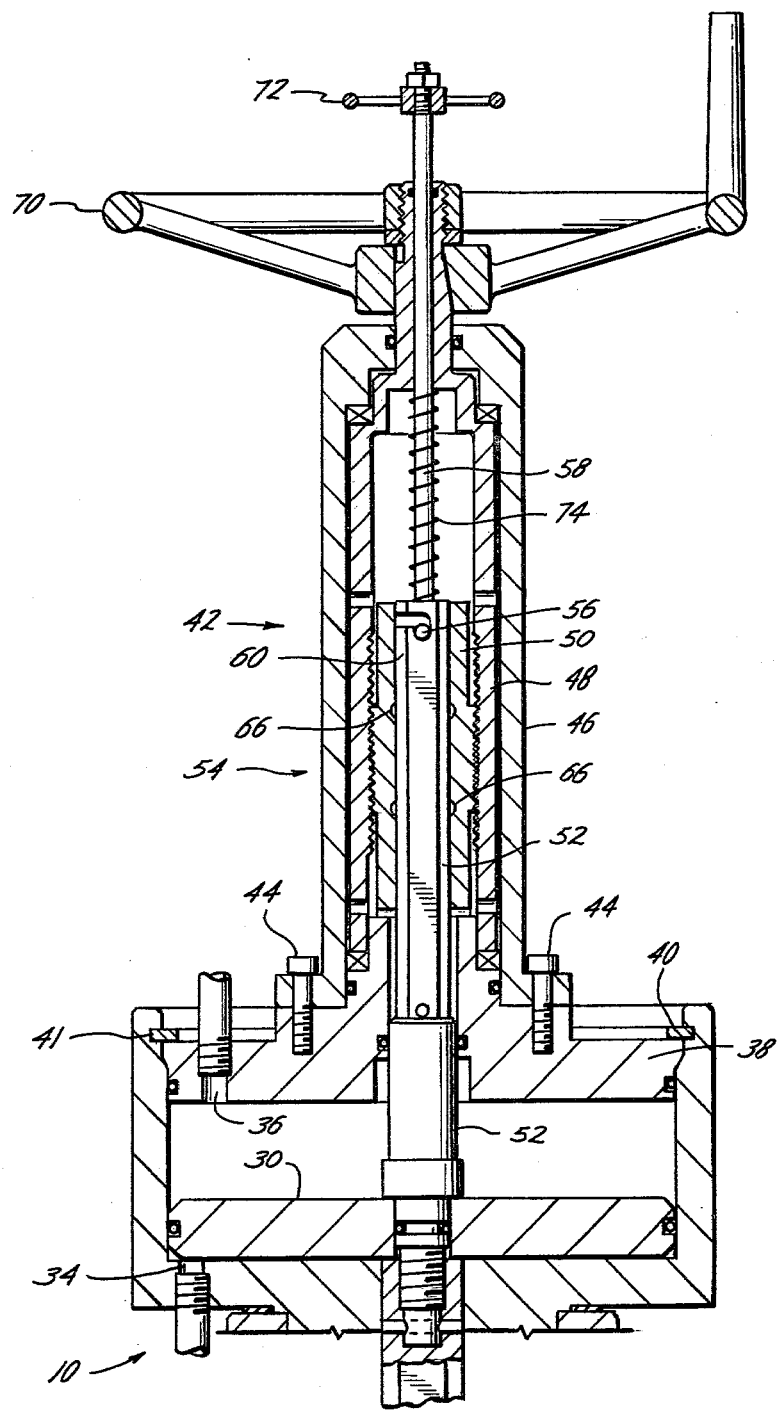

The improved choke 10 of the present invention is shown in FIGS. 1A and 1B with FIG. 1B being the upper extension of the structure shown in FIG. 1A. FIG. 1A illustrates the choke body 12 which has an inlet 14, an outlet 16 and the passage 18 through the body 12 communicating between the inlet 14 and the outlet 16. The seat ring 20 is positioned within the body 12 in surrounding relationship to the passage 18 whereby all of the flow passing through the choke 10 flows through the bore 22 of the seat ring 20. The valve member or throttling gate 24 is sized to coact with the seat ring 20 to restrict the flow through the passage 18. The valve member 24 is secured to the operator rod 26 which controls the movement of the valve member 24 toward and away from the seat ring 20. Rod 26 is slidably mounted within the bore 27 of operator body 28 which is threaded into body 12 as shown with bore 27 in alignment with bore 22 through seat ring 20.

Referring to FIG. 1B., the movement of gate 24 is responsive to the movement of the piston 30 to which rod 26 is secured, which movement results from the pressure differentials across the piston 30 within cylinder 32 in operator body 28. Pressure is delivered to the opposite sides of the piston 30 within the cylinder 32 through the ports 34 and 36. The outer end of the cylinder 32 is closed by the plate 38 which is secured within the cylinder 32 to body 28 by the snap ring 40 positioned within the groove 41 on the interior of body 28.

The manual override assembly 42 is secured to the plate 38 by the cap screws 44. The override body or housing 46 is generally tubular in shape to receive the operating stem 48 which is in threaded engagement with the thrust collar 50. The thrust collar 50 is releasably connected to the shaft 52 which is connected to and extends from the piston 30. Thrust washers 76 and 78 are positioned at each end of operating stem 48 to allow it to rotate but to prevent its axial movement. The releasable connecting means 54 between the shaft 52 and the thrust collar 50 includes the pin 56 which is secured in the locking shaft 58 and adapted to slide within J-slots 60 in the outer end of the shaft 52 and the locking balls 62 (FIGS. 2, 3 and 4) which are positioned within ports 64 in the shaft 52 and are free to be cammed or wedged into position within the detents or recesses 66 in the interior surface of the thrust collar 50 by the tapered surfaces 68 on the locking shaft 58.

Figure 2:
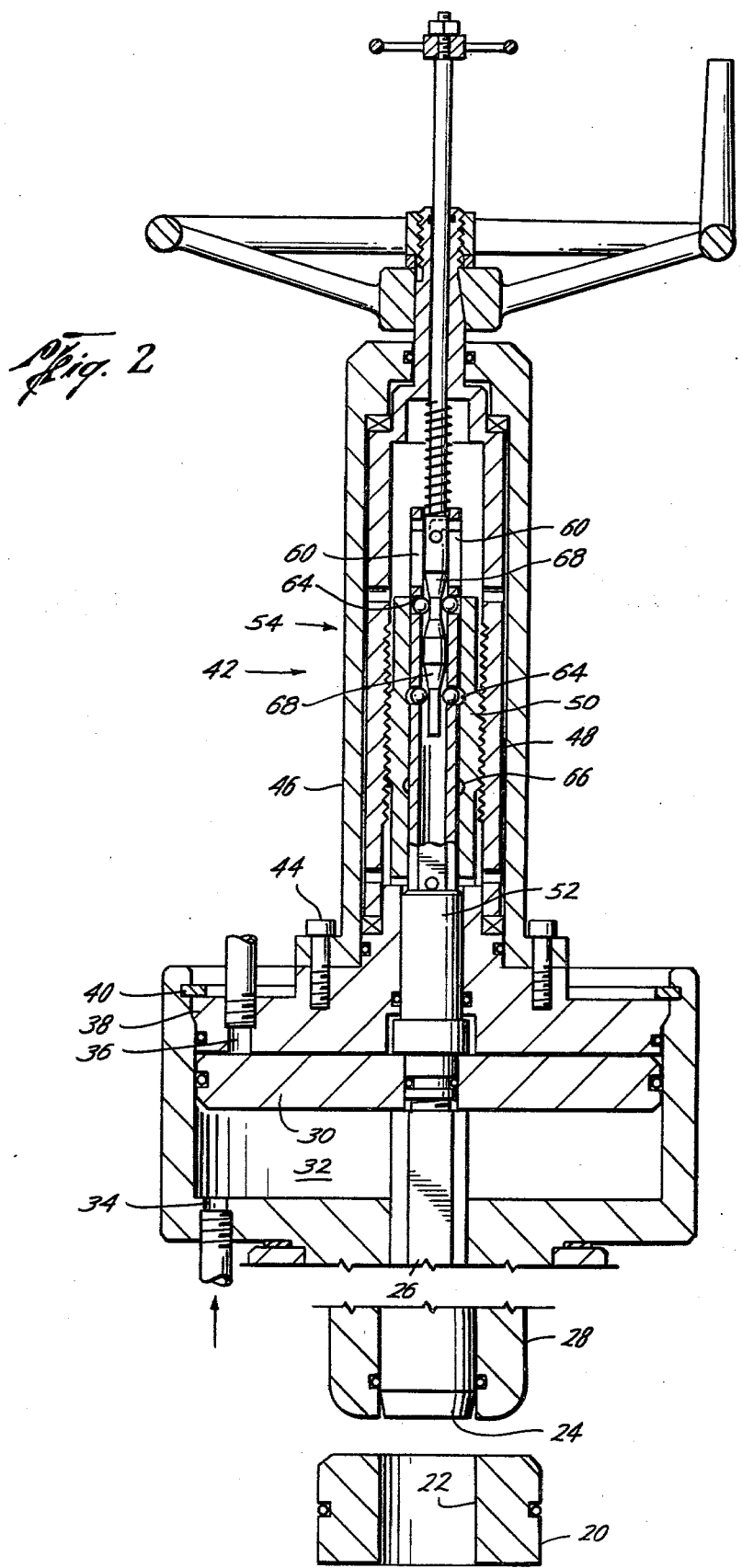
FIG. 2 is a sectional view, similar to FIG. 1B with the manual operator disengaged and illustrating the connecting means between the thrust collar and the shaft.

The hand wheel 70 is secured to the outer extension of the operating stem 48 and is adapted to rotate it. Handle 72 is secured to the outer extension of the locking shaft 58 and is adapted to move the locking shaft in an axial and rotary direction to control the releasable engagement between the shaft 52 and the thrust collar 50. This releasable engagement is clearly understood by comparison of the positions of the releasable connecting means 54 in FIGS. 2 and 3. Spring 74 surrounds the locking shaft 58 and urges it toward a position to cam the locking balls 62 into engagement with the detents 66. The pin 56 when in the upper or J-portion of slot 60 holds the locking shaft in released position as shown in FIG. 2 against the force exerted by spring 74. As best seen in FIG. 4, the exterior of the shaft 52 is hexagonal as is the interior of the thrust collar 50 to prevent relative rotation between such two parts whereby the ports 64 are maintained in alignment with the detents 66.

Thus, with the releasable connecting means 54 being disengaged so that the balls are not locked partially within the detents 66, the movement of the throttling gate 24 is controlled by the movement of the piston 30 within the cylinder 32 responsive to pressures on opposite sides thereof. The locking means is held in such inactive position by positioning the pin 56 in the inactive or J-portion of the slot 60 as shown in FIG. 1B. When it is desired that the manual override assembly 42 be used, handle 72 is pulled and rotated to remove pin 56 from the J-portion of slot 60, then the hand wheel 70 is rotated to bring the detents 66 into registry with the ports 64 and a by-pass (not shown) between opposite sides of the cylinder is opened to prevent hydraulic locking of the piston 30. Then the handle 72 and shaft 58 are free to move inwardly responsive to the force of the spring 74 forcing the balls 62 outwardly through the ports 64 into the detents 66 to provide a direct connection between the shaft 52 and the thrust collar 50. Thereafter rotation of the hand wheel 70 causes the operating stem 48 to rotate with respect to the thrust collar 50. This rotation causes axial movement of thrust collar 50 because of the threaded connection to operating stem 48 to prevent its moving in an axial direction. Axial movement of the thrust collar 50 is translated into an axial movement of the shaft 52 and the operator rod 26 whereby the throttling gate 24 can be brought into engagement with the seat ring 20 or brought to any open position as desired.

What is claimed is:

1. A choke comprising a body having an inlet, an outlet, a passage communicating from said inlet to said outlet and a seat ring surrounding said passage, a valve member, pressure responsive means connected to said valve member for moving said valve member toward and away from said seat ring to control flow through said passage, a shaft connected to said valve member, the outer portion of said shaft being tubular and having a plurality of ports and at least one J-slot, a thrust collar surrounding said shaft being slidable axially thereon, having means preventing relative rotation therebetween and having a plurality of detents on its interior surface, a plurality of locking balls, one of said locking balls positioned in each of said ports, an operating stem in threaded engagement with said thrust collar, means for retaining said operating stem against axial movement toward and away from said body, a locking shaft extending into the interior of said tubular portion of said shaft and having tapered surfaces, means for retaining said locking shaft in inactive position, manipulation of said locking shaft releasing said retaining means so that said locking shaft can move to active position with said tapered surfaces urging said locking balls into said detents, and means for rotating said operating stem to move the thrust collar axially and with said locking balls in said detents to move said shaft and said valve member toward said seat ring.

2. A choke according to claim 1 wherein said retaining means includes a pin extending outward from said locking shaft and engaging within a J-slot in said valve member shaft.

* * * * *